(12) United States Patent
Neumann

(10) Patent No.: US 11,968,189 B2
(45) Date of Patent: *Apr. 23, 2024

(54) METHODS AND SYSTEMS FOR GENERATING A SECURE COMMUNICATION CHANNEL INTERFACE FOR VIDEO STREAMING OF SENSITIVE CONTENT

(71) Applicant: KPN INNOVATIONS, LLC., Lakewood, CO (US)

(72) Inventor: Kenneth Neumann, Lakewood, CO (US)

(73) Assignee: KPN INNOVATIONS, LLC, Lakewood, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/833,634

(22) Filed: Jun. 6, 2022

(65) Prior Publication Data

US 2022/0303252 A1 Sep. 22, 2022

Related U.S. Application Data

(63) Continuation of application No. 16/919,674, filed on Jul. 2, 2020, now Pat. No. 11,394,695.

(51) Int. Cl.
*H04L 9/40* (2022.01)
*G06F 21/62* (2013.01)
*H04L 65/1069* (2022.01)
*H04L 65/60* (2022.01)
*H04L 67/52* (2022.01)

(52) U.S. Cl.
CPC ...... *H04L 63/0428* (2013.01); *G06F 21/6245* (2013.01); *H04L 63/08* (2013.01); *H04L 65/1069* (2013.01); *H04L 65/60* (2013.01); *H04L 67/52* (2022.05)

(58) Field of Classification Search
CPC ..... H04L 63/0428; H04L 67/52; H04L 63/08; H04L 65/60; G06F 21/6245
USPC ........................................................ 713/168
See application file for complete search history.

(56) References Cited

U.S. PATENT DOCUMENTS

| | | | | |
|---|---|---|---|---|
| 9,361,021 | B2* | 6/2016 | Jordan | G06Q 10/10 |
| 10,057,337 | B2* | 8/2018 | Kyser | A61B 5/0022 |
| 10,325,070 | B2* | 6/2019 | Beale | G16H 30/20 |
| 10,692,599 | B2* | 6/2020 | Hyde | G05B 15/02 |
| 10,855,952 | B1* | 12/2020 | Rocklin | H04L 65/1089 |

(Continued)

*Primary Examiner* — Dereena T Cattungal
(74) *Attorney, Agent, or Firm* — Caldwell Intellectual Property Law

(57) ABSTRACT

A system for generating a secure communication channel interface, the system including a computing device configured to transmit, to a user client device, a configuration packet uniquely identifying the computing device, receive, from the user client device, a confirmation authentication for the configuration packet, initiate a secure communication channel interface with the user client device, establish a security baseline parameter within the secure communication channel interface, wherein establishing a security baseline parameter includes capturing a baseline audiovisual measurement using an audiovisual capture device, detect a change in the security baseline parameter by detecting a change in relation to a baseline user environment landmark, and execute a mitigation action to prevent a security breach.

14 Claims, 9 Drawing Sheets

(56) References Cited

U.S. PATENT DOCUMENTS

| | | | |
|---|---|---|---|
| 11,581,099 B1* | 2/2023 | Rufo | G16H 40/67 |
| 2014/0368601 A1* | 12/2014 | deCharms | H04N 7/147 |
| | | | 348/14.02 |
| 2018/0123804 A1* | 5/2018 | Smith | H04L 63/0869 |
| 2018/0191695 A1* | 7/2018 | Lindemann | H04L 63/0853 |
| 2018/0342329 A1* | 11/2018 | Rufo | G08B 25/10 |
| 2020/0222813 A1* | 7/2020 | Baszucki | A63F 13/352 |
| 2020/0357374 A1* | 11/2020 | Verweij | H04S 7/304 |
| 2020/0402674 A1* | 12/2020 | DeBates | A61N 1/37247 |
| 2022/0005191 A1* | 1/2022 | Connor | G06T 7/0012 |
| 2022/0254019 A1* | 8/2022 | Connor | G06T 7/0012 |

* cited by examiner

METHODS AND SYSTEMS FOR GENERATING A SECURE COMMUNICATION CHANNEL INTERFACE FOR VIDEO STREAMING OF SENSITIVE CONTENT

CROSS-REFERENCE TO RELATED APPLICATIONS

This application is a continuation of Non-provisional application Ser. No. 16/919,674 filed on Jul. 2, 2020 and entitled "METHODS AND SYSTEMS FOR GENERATING A SECURE COMMUNICATION CHANNEL INTERFACE FOR VIDEO STREAMING OF SENSITIVE CONTENT," the entirety of which is incorporated herein by reference.

FIELD OF THE INVENTION

The present invention generally relates to the field of security. In particular, the present invention is directed to methods and systems for generating a secure communication channel interface for video streaming of sensitive content.

BACKGROUND

Network connections can be susceptible to attack, leading to publication of private and sensitive information. Frequently, this can leave users unable to securely communicate, particularly in situations in need of immediate attention.

SUMMARY OF THE DISCLOSURE

In an aspect, a system for generating a secure communication channel interface for video streaming of sensitive content, the system comprising a computing device designed and configured to transmit, to a user client device, a configuration packet uniquely identifying the computing device, receive, from the user client device, a confirmation authentication for the configuration packet, initiate a secure communication channel interface with the user client device, establish a security baseline parameter within the secure communication channel interface, wherein establishing a security baseline parameter includes capturing a baseline audiovisual measurement using an audiovisual capture device, detect a change in the security baseline parameter by detecting a change in relation to a baseline user environment landmark, wherein the detection includes pausing the initiation of the secure communication channel interface as a function detecting the change in security, confirm the security of the user client device and the computing device, and reinitiate the secure communication channel, and execute a mitigation action to prevent a security breach.

In an aspect, A method of generating a secure communication channel interface for video streaming of sensitive content, the method comprising transmitting, at a computing device and to a user client device, a configuration packet uniquely identifying the computing device, receiving, at the computing device and from the user client device, a confirmation authentication for the configuration packet, initiating, at the computing device, a secure communication channel interface with the user client device, establishing, at the computing device, a security baseline parameter within the secure communication channel interface, wherein establishing a security baseline parameter includes capturing a baseline audiovisual measurement using an audiovisual capture device, detecting, at the computing device, a change in the security baseline parameter by detecting a change in relation to a baseline user environment landmark, wherein the detection includes pausing the initiation of the secure communication channel interface as a function detecting the change in security, confirm the security of the user client device and the computing device, and reinitiate the secure communication channel, and executing, at the computing device, a mitigation action to prevent a security breach.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for generating a secure communication channel interface for video streaming of sensitive content. In an embodiment, a secure communication channel interface is initiated between a user client device and a computing device. A security baseline parameter is established and utilized to detect a change in security. Computing device is configured to execute a mitigation action to prevent a security breach.

Figure 1:
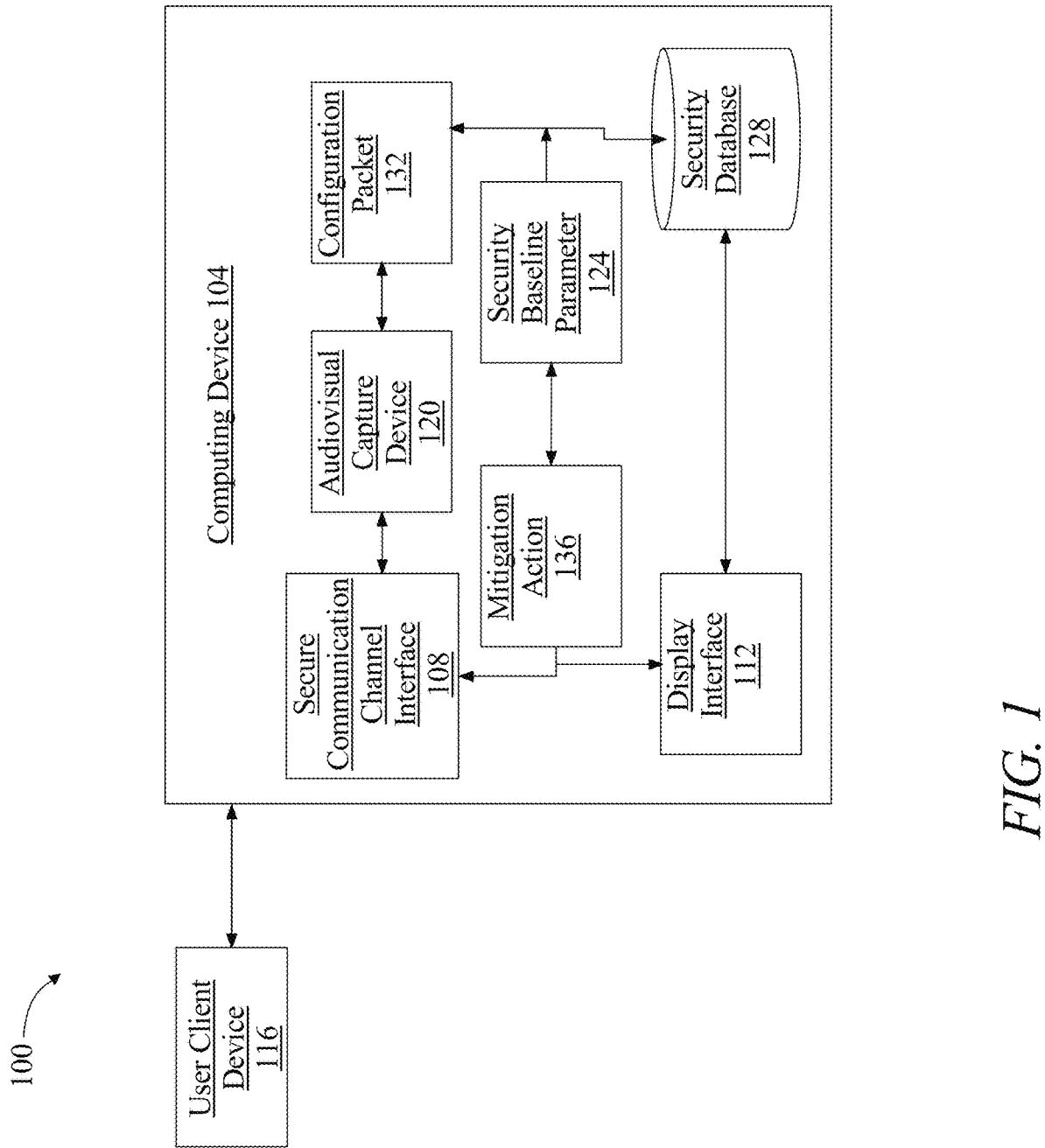
FIG. 1 is a block diagram illustrating an exemplary embodiment of a system for generating a secure communication channel interface.

Referring now to FIG. 1, an exemplary embodiment of a system 100 for generating a secure communication channel interface for video streaming of sensitive content is illustrated. System 100 includes a computing device 104. Computing device 104 may include any computing device 104 as described in this disclosure, including without limitation a microcontroller, microprocessor, digital signal processor (DSP) and/or system on a chip (SoC) as described in this disclosure. Computing device 104 may include, be included in, and/or connect with a mobile device such as a mobile telephone or smartphone. Computing device 104 may include a single computing device 104 operating independently or may include two or more computing device 104 operating in concert, in parallel, sequentially or the like; two or more computing devices 104 may be included together in a single computing device 104 or in two or more computing devices 104. Computing device 104 may interface or connect with one or more additional devices as described below in further detail via a network interface device. Network interface device may be utilized for connecting computing device 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an association, a building, a campus or other relatively small geographic space), a telephone network, a data network associated with a telephone/voice provider (e.g., a mobile communications provider data and/or voice network), a direct connection between two computing devices 104, and any combinations thereof. A network may employ a wired and/or a wireless mode of communication. In general, any network topology may be used. Information (e.g., data, software etc.) may be transmitted to and/or from a computer and/or a computing device 104. Computing device 104 may include but is not limited to, for example, a computing device 104 or cluster of computing devices 104 in a first position and a second computing device 104 or cluster of computing devices 104 in a second position. Computing device 104 may include one or more computing devices 104 dedicated to data storage, security, dispersal of traffic for load balancing, and the like. Computing device 104 may distribute one or more computing tasks as described below across a plurality of computing devices 104 of computing device 104, which may operate in parallel, in series, redundantly, or in any other manner used for dispersal of tasks or memory between computing devices 104. Computing device 104 may be implemented using a "shared nothing" architecture in which data is cached at the operative, in an embodiment, this may enable scalability of system 100 and/or computing device 104.

Continuing to refer to FIG. 1, computing device 104 may be designed and/or configured to perform any method, method step, or sequence of method steps in any embodiment described in this disclosure, in any order and with any degree of repetition. For instance, computing device 104 may be configured to perform a single step or sequence recurrently until a desired or commanded outcome is achieved; repetition of a step or a sequence of steps may be performed iteratively and/or recursively using outputs of previous repetitions as inputs to subsequent repetitions, assembling inputs and/or outputs of repetitions to produce an aggregate result, reduction or decrement of one or more variables such as global variables, and/or division of a larger processing task into a set of iteratively addressed smaller processing tasks. Computing device 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, computing device 104 is configured to initiate a secure communication channel interface 108 between a user client device and computing device 104. A "secure communication channel interface," as used in this disclosure, is a communication medium within an interface. A secure communication channel interface 108 may include an application, script, and/or program capable of providing a means of communication between at least two parties, including any oral and/or written forms of communication. A secure communication channel interface 108 may allow computing device 104 to interface with electronic devices through graphical icons, audio indicators including primary notation, text based user interfaces, typed command labels, text navigation, and the like. A secure communication channel interface 108 may include slides or other commands that may allow a user to select one or more options. A secure communication channel interface 108 may include free form textual entries, where a user may type in a response and/or message. A secure communication channel interface 108 includes a display interface 112. Display interface 112 includes a form or other graphical element having display fields, where one or more elements of information may be displayed. Display interface 112 may display data output fields including text, images, or the like containing one or more messages. A secure communication channel interface 108 may include data input fields such as text entry windows, drop-down lists, buttons, checkboxes, radio buttons, sliders, links, or any other data input interface that may capture user interaction as may occur to persons skilled in the art upon reviewing the entirety of this disclosure. A secure communication channel interface 108 may be provided, without limitation, using a web browser, a native application, a mobile application, and the like.

With continued reference to FIG. 1, computing device 104 initiates a secure communication channel interface 108 with a user client device 116. A "user client device," as used in this disclosure, is a second computing device, including for example a mobile device such as a smartphone, tablet, laptop, desktop, and/or any other type of device suitable for use as computing device 104. User client device 116 is operated by a user, including any human being. Computing device 104 initiates secure communication channel interface 108 using any network methodology as described herein. In an embodiment, a secure communication channel interface 108 may be utilized to facilitate communications between a user client device 116 operated by a first human being, and computing device 104 which may be operated by a second human being. For example, user client device 116 may be operated by a patient who is in communication with a medical professional operating computing device 104, and secure communication channel interface 108 may be utilized to have a telemedicine appointment. In yet another non-limiting example, user client device 116 may be operated by a first member of a support group, and computing device 104 may be operated by a second member of the support group, whereby secure communication channel interface 108 may be utilized to facilitate support group meetings and secure communications between members of the support group.

With continued reference to FIG. 1, a secure communication channel interface 108 includes an audiovisual capture device 120. An "audiovisual capture device," as used in this disclosure, is a device used to record sound and/or images. An audiovisual capture device may include but is not limited to, a camera, a video camera, a mobile device, a recording device, a DVD player, a sensor, a television tuner, a video capture card, a universal serial bus (USB) audio and/or visual capture device, and the like. In an embodiment, an audiovisual capture device 120 may be located within user client device 116.

With continued reference to FIG. 1, computing device 104 is configured to establish a security baseline parameter 124 within secure communication channel interface 108. A "security baseline parameter," as used in this disclosure, is a measurement that captures one or more device capabilities of a user client device 116 and/or computing device 104. A security baseline parameter 124 may be measured by computing device 104 and may capture one or more measurements using secure communication channel interface 108, display interface 112, and/or audiovisual capture device 120. Information relating to one or more security baseline parameters 124 may be stored within security database 128. Security database 128 may be implemented without limitation, as a relational database, a key-value retrieval datastore such as a NOSQL database, or any other format or structure for use as a datastore that a person skilled in the art would recognize as suitable upon review of the entirety of this disclosure. Establishing a security baseline parameter includes using audiovisual capture device 120 to establish a baseline user environment landmark. A "user environment landmark," as used in this disclosure, is any feature and/or qualifying characteristic unique to a user, and/or any physical environment and/or location surrounding a user. A user environment landmark may include but is not limited to any physical object located in a room and/or environment where a user is location, such as a couch that a user is sitting on, or a backdrop looking out onto a busy street when a user is sitting in the user's office at work. A user environment landmark may be established and/or captured using audiovisual capture device 120. For instance and without limitation, audiovisual capture device 120 may scan a room where a user is located, prior to initiating a meeting between the user and the user's functional medicine physician. In yet another non-limiting example, audiovisual capture device 120 may record baseline noise levels in a user's office, where a user is located and intendeds to have a video conference with the user's psychiatrist. A user environment landmark may include the user, including any distinguishing features and/or representations of the user, such as for example, any unique biometric identifiers such as a user's fingerprints, facial recognition, a user's voice, a user's signature, a DNA sequence, a measurement of a user's gait, and the like. A user environment landmark may include any geolocation data pertaining to a user, including any of the geolocation data as described herein. For example, a user's environment landmark may include the user's home address, where the user is located when the user engages in a telemedicine conference with the user's functional medicine doctor.

With continued reference to FIG. 1, initiating a secure communication channel interface 108 includes transmitting to user client device 116 a configuration packet 132 uniquely identifying computing device 104. A "configuration packet," as used in this disclosure, is an encrypted message including a non-public device identifier." An encrypted message, includes any language that contains text, characters, and/or symbols that have been converted into an alternative form, such as but not limited to ciphertext. An encrypted message may include using an algorithm and/or a series of algorithms to transform plaintext messages into ciphertext. Encrypted messages may only be viewed in a non-encrypted from by decrypting it using a correct decryption key. Encrypted messages may be decrypted using both symmetric and asymmetric cryptographic key pairs, such as for example a public and private key pair. An encrypted message may be generated in a manner that complies with the Health Insurance Portability and Accountability Act (HIPPA) of 1996. A message may be encrypted using a pseudo-random encryption key generated by an algorithm. In one embodiment, a process of converting plaintext into ciphertext is known as "encryption." Encryption process may involve the use of a datum, known as an "encryption key," to alter plaintext. Cryptographic system may also convert ciphertext back into plaintext, which is a process known as "decryption." Decryption process may involve the use of a datum, known as a "decryption key," to return the ciphertext to its original plaintext form. In embodiments of cryptographic systems that are "symmetric," decryption key is essentially the same as encryption key: possession of either key makes it possible to deduce the other key quickly without further secret knowledge. Encryption and decryption keys in symmetric cryptographic systems may be kept secret and shared only with persons or entities that the user of the cryptographic system wishes to be able to decrypt the ciphertext. One example of a symmetric cryptographic system is the Advanced Encryption Standard ("AES"), which arranges plaintext into matrices and then modifies the matrices through repeated permutations and arithmetic operations with an encryption key.

With continued reference to FIG. 1, a "non-public device identifier," as used in this disclosure, is a decryption key that cannot be readily deduced without additional secret knowledge, such as for example, a private key. A non-public device identifier may include a randomly generated number that cannot be easily guessed. A non-public device identifier may be generated using a stream cipher and/or a block cipher. An encrypted message may be transmitted with a non-public device identifier, to initiate secure communication between computing device 104 and user client device 116.

With continued reference to FIG. 1, computing device 104 receives from user device 104 a confirmation authentication a configuration packet 132. A confirmation may include any message, that allows user client device 116 to confirm the identify and/or authenticity of computing device 104. A confirmation may be transmitted from user client device 116 to computing device 104 using any network methodology as described herein. In an embodiment, a confirmation authentication may include receiving from user client device 116 a configuration packet 132 uniquely identifying user client device 116. In such an instance, computing device 104 may receive the configuration packet 132 uniquely identifying user client device 116 and authenticate the configuration packet 132, and the identify of user client device 116. Computing device 104 establishes a communication exchange as a function of receiving from user client device 116, a confirmation authenticating the configuration packet 132. A communication exchange includes any telecommunication handshake that includes an automated process of communications between two or more participants, such as computing device 104 and user client device 116. A telecommunication handshake includes the exchange of information establishing protocols of communication at the start of communication, before full communication commences. A telecommunication handshake may include exchanging signals to establish a communication link as well as to agree as to which protocols to implement. A telecommunication handshake may include negotiating parameters to be utilized between user client device 116 and computing device 104, including information transfer rate, coding alphabet, parity, interrupt procedure, and/or any other protocol or hardware features. A telecommunication handshake may include but is not limited to a transmission control protocol (TCP), simple mail transfer protocol (SMTP), transport layer security (TLS), Wi-Fi protected access (WPA), and the like.

With continued reference to FIG. 1, a security baseline parameter 124 may including capturing using audiovisual capture device 120 a baseline audiovisual measurement. A baseline audiovisual measurement may include measuring any motion and/or sound in a room where a user client device 116 is located. For example, a baseline audiovisual measurement may capture a sound recording, containing background noise in a user's office, where a user is sitting. A baseline audiovisual measurement may include capturing one or more audio and/or visual recordings that identify a user, such as by capturing a picture of a user's face, or an audio recording of a user speaking, to capture a measurement of the user's voice. A baseline audiovisual measurement may include measuring any landmarks located in a space where a user is located. For example, a baseline audiovisual measurement may capture a grandfather clock that is located behind a couch where a user is sitting, in the user's living room. In an embodiment, a baseline audiovisual measurement may be captured, by transmitting to the user one or more user commands, to capture a specific baseline audiovisual measurement. For example, computing device 104 may display instructions on display interface 112 that direct a user to capture a visual scan of the room where the user is located, using audiovisual capture device 120. Information pertaining to a security baseline parameter 124 may be stored within security database 128.

With continued reference to FIG. 1, a security baseline parameter 124 may include establishing secure logon credentials for user client device 116 and/or computing device 104, such for example including a multi-factor authentication method. A multi-factor authentication method is a method in which a user is granted access to a device, such as computing device 104 and/or user client device 116, only after successfully presenting two or more factors to an authentication mechanism. A factor may include one or more components utilized to confirm a user's identify. A factor may include a knowledge factor that require a user to prove specific knowledge, in order to authenticate the user's identify. A knowledge factor may include a password, a personal identification number (PIN), a secret question, and the like. A factor may include a possession factor, that requires a user to retain possession of an item, in order to authenticate the user's identify. A possession factor may include for example a disconnected token, a connected token, and/or a software token. A factor may include an inherent factor which may include a factor uniquely associated with a user. An inherent factor may include one or more biometric measurements such as for example a fingerprint, a face, a voice, and/or an iris recognition. An inherent factor may include a behavioral biometric such as a measurement of a user's gait, or a keystroke dynamic. A factor may include a location based factor that involves identifying the physical location of a user. A multi-factor authentication method may include two-factor authentication where a user's identification may be identified by using two different factors such as something the user knows such as a password, something the user has such as a physical card, and/or something that the user is, such as a biometric measurement including facial recognition or an iris scan. A multi-factor authentication method may include a two-step verification and/or two-step authentication that may confirm a user's identity by using two different factors to authenticate the user's identity, such as for example a password and a code transmitted to a user at a second device, such as a code sent to a mobile device on a short message service (SMS).

With continued reference to FIG. 1, computing device 104 establishes a security baseline parameter 124 by identifying a network parameter. A network parameter may include data specifying information relating to any computing devices that are in communication with user client device 116 and/or computing device 104. For example, a network parameter may include establishing traffic level through a local network for a defined period of time, prior to and/or currently with initiating a secure communication channel interface between user client device 116 and computing device 104. Traffic level on a network may be measured such as by sniffing using a packet analyzer that intercepts and logs traffic that passes over a digital network and/or part of a network. A packet analyzer may include intercepting and logging traffic. For example, as data streams flow across a network, a packet analyzer may capture each packet, and if needed, decode raw data contained within each packet, to analyze the content, and determine network activity. A packet analyzer may include but is not limited to capsa network analyzer, charles web debugging proxy, carnivore, commview, dSniff, endaceprobe analytics platform, Ettercap, fiddler, kismet, lanmeter, narusInsight, ngrep, omnipeek, skygrabber, snopp, tcpdump, observer analyzer, wireshark, and the like. Computing device 104 may identify a network parameter using other local agents that may measure bandwidth use on individual machines and/or routers, including but not limited to simple network management protocol (SNMP), and/or Windows management instrumentation (WMI). For example, a local agent such as an inline appliance may sit between a local area network (LAN) and the LAN's exit point, and capture all packets leaving and/or entering the network. In such an instance, a local agent may be undetectable by other users.

With continued reference to FIG. 1, computing device 104 establishes a security baseline parameter 124 by determining a geolocation of user client device 116 as a function of geolocation of computing device 104. A "geolocation," as used in this disclosure, is any global position system (GPS) of a device. A geolocation may be identified using a description of the latitude and/or longitude of a position where user client device 116 and/or computing device 104 is located. A GPS may be obtained based on an input received from user client device 116. Computing device 104 may utilize a geolocation of user client device 116 to determine where user client device 116 is located in reference to computing device 104. For example, computing device 104 may determine that user client device 116 is located in San Diego, California, while computing device 104 is located approximately five hundred miles away in San Francisco, California. In an embodiment, computing device 104 may evaluate multiple inputs containing geolocation data, to obtain an average measurement as to how far away user client device 116 is from computing device 104. For example, computing device 104 may determine that user client device 116 on average is located within a fifty mile radius of computing device 104.

With continued reference to FIG. 1, computing device 104 is configured to detect a change in a security baseline parameter 124 wherein detecting a change in a security baseline parameter 124 includes detecting a change in relation to a baseline user environment landmark. A change in a security baseline parameter 124 includes any deviation from the security baseline parameter. Computing device 104 is configured to detect a physical intrusion using audiovisual capture device 120. A physical intrusion includes any person and/or object entering into a restricted area, where a user may be located. For example, a security baseline parameter 124 may include a video scan of a user's living room, where a user is sitting. In such an instance, a change in a security baseline parameter 124 may include a physical intrusion such as when a user's spouse walk in the living room and is captured by audiovisual capture device 120. A physical intrusion may include an object entering a restricted area, such as a user who is seated in front of a window, and an object such as a curtain falls off the window and is captured by audiovisual capture device 120. In yet another non-limiting example, a change in relation to a baseline user environment landmark may include determining that a desk captured in a security baseline parameter is no longer captured by audiovisual capture device 120, and instead the user is located in a different environment, such as the user's kitchen. In yet another non-limiting example, a change in relation to a baseline user environment landmark may indicate that a human being is blocking a baseline user environment landmark, such as a user's spouse who accidentally entered a room where a user is located, and is physically blocking the user.

With continued reference to FIG. 1, computing device 104 is configured to detect a change in a security baseline parameter 124, including a change in an optically detected motion level. An optically detected motion level may include any measurement of displacement, distance, velocity, acceleration, speed, and/or time. An optically detected motion level may be measured as applied to objects, human bodies, animals, matter particles, matter fields, radiation, radiation particles, and the like. Motion levels may be detected based on one or more measurements of momentum. An optically detected motion level may be measured using a discrete cosine transformation (DCT), which expresses a finite sequence of data points in terms of a sum of cosine functions oscillating at various frequencies. DCT expresses a function or a signal in terms of a sum of sinusoids with different frequencies and amplitudes. A DCT operates on a function at a finite number of discrete data points. A DCT may separate an image, including any audio and/or visual image captured by audiovisual capture device 120 and separate the image into parts including spectral sub-bands, of differing importance. A DCT may transform a signal or image from a spatial domain to a frequency domain. A DCT may take an image and/or signal and break the image and/or signal into 8×8 blocks of pixels. Working from left to right, and top to bottom, the DCT is applied to each block. Each block may then be compressed through quantization, and the array of compressed blocks that constitute the original image and/or signal are stored in a drastically reduced amount of space. The image and/or signal may be reconstructed decompression, which may include using inverse discrete cosine transformation (IDCT). A DCT may be utilized to obtain and/or determine changes in optical motion, as compared to one or more security baseline parameters 124.

With continued reference to FIG. 1, computing device 104 is configured to detect a change in a security baseline parameter 124 including detecting a change in local network traffic. A change in local network traffic may include any change in a network parameter, such as for example, increased local network traffic. For example, a packet analyzer, including any of the packet analyzers as described above in more detail, may detect increased network traffic, and a great number of devices connecting to a local network that user client device 116 and computing device 104 are both connected to. A change in local network traffic may include determining that a secondary device is attempting to communicate with user client device 116, such as an unexpected Bluetooth pairing, a hotspot linking, and the like. A change in local network traffic may also include an indication that network traffic is being diverted such as to a particular network or away from a particular network. Computing device 104 is configured to detect other various changes in security including for example any changes in lighting in the background of computing device 104 and/or user client device 116, aberrations, changes in geometrics, critical file changes, unusually slow network or devices, obvious device tampering, locked user accounts, unusual outbound traffic, abnormal administrative user activity, and/or any sharp difference in audio that would suggest a security breach in a video-audio appointment.

With continued reference to FIG. 1, computing device 104 is configured to execute a mitigation action to prevent a security breach. A "mitigation action," as used in this disclosure, is an action intended to cure a change in security. A cure may include one or more actions, intended to correct a security breach. A security breach may occur when an intruder gains unauthorized access to secure communication channel 108 between user client device 116 and computing device 104. A mitigation action includes displaying within secure communication channel 108 a warning message. A warning message may contain one or more characters, symbols, and/or text, indicating that suspicious activity has been detected. Computing device 104 transmits to user client device 116 a new configuration packet and authenticates the security of user client device 116 as a function of the new configuration packet. Transmitting a new configuration packet may include stopping communications through secure communication channel interface 108 and initiating a new secure communication channel interface 108 once the security of user client device 116 has been authenticated.

With continued reference to FIG. 1, a mitigation action includes pausing the initiation of secure communication channel interface 108 as a function of detecting a change in security. Pausing may include temporarily suspending and/or stopping secure communication channel interface 108. Computing device 104 confirms the security of user client device 116 and computing device 104 and reinitiates secure communication channel interface 108. Confirming the security of user client device 116 may include establishing a second security baseline parameter, 124, using any of the methodologies as described above in more detail.

With continued reference to FIG. 1, computing device 104 is configured to detect a new program session on user client device 116. A "new program session," as used in this disclosure, is an application other than system 100 that is running and/or initiated on user client device 116. A new program session may include for example, a word processor, a game program, a spreadsheet, a database system, a graphics program, a web browser, and the like. Computing device 104 detects a new program while secure communication channel interface 108 has been initiated, and computing device 104 is in communication with user client device 116. Computing device 104 disables a new program session. Disabling a new program session includes blocking and/or suspending a new program session until communications between user client device 116 and computing device 104 have been completed, and secure communication channel interface 108 has been disabled.

Figure 2:
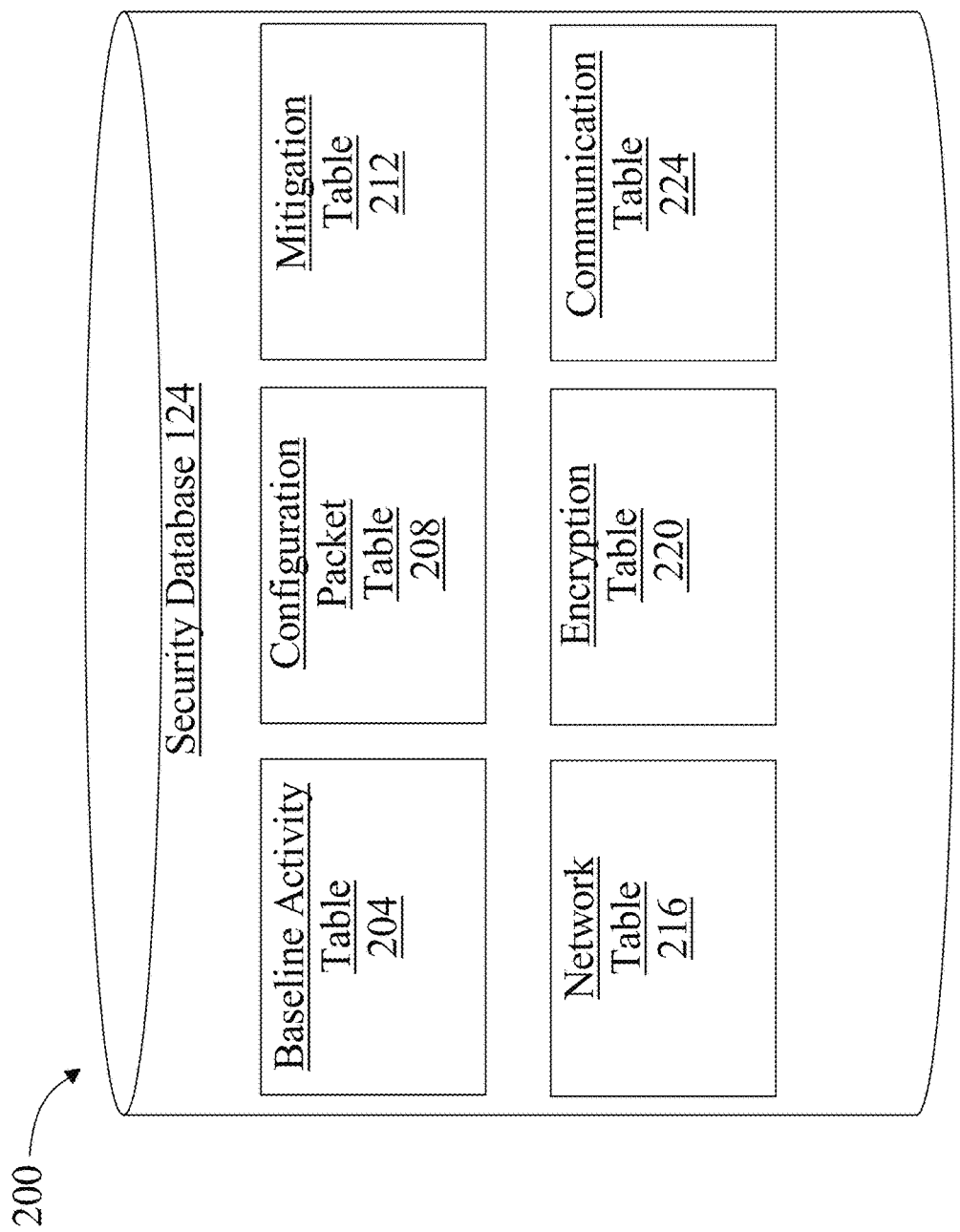
FIG. 2 is a block diagram illustrating an exemplary embodiment of a security database.

Referring now to FIG. 2, an exemplary embodiment 200 of security database 124 is illustrated. Security database 124 may be implemented as any data structure suitable for use as described above in more detail in reference to FIG. 1. One or more tables contained within security database 124 may include baseline activity table 204; baseline activity table 204 may include one or more security baseline parameters 124. One or more tables contained within security database 124 may include configuration packet table 208; configuration packet table 208 may include information relating to one or more configuration packets 132. One or more tables contained within security database 124 may include mitigation table 212; mitigation table 212 may include information relating to one or more mitigation actions 136. One or more tables contained within security database 124 may include network table 216; network table 216 may include information relating to one or local networks and/or one or more network parameters. One or more tables contained within security database 124 may include encryption table 220; encryption table 220 may include information relating to encryption algorithm and/or encryption techniques. One or more tables contained within security database 124 may include communication table 224; communication table 224 may include information relating to a communication exchange.

Figure 3:
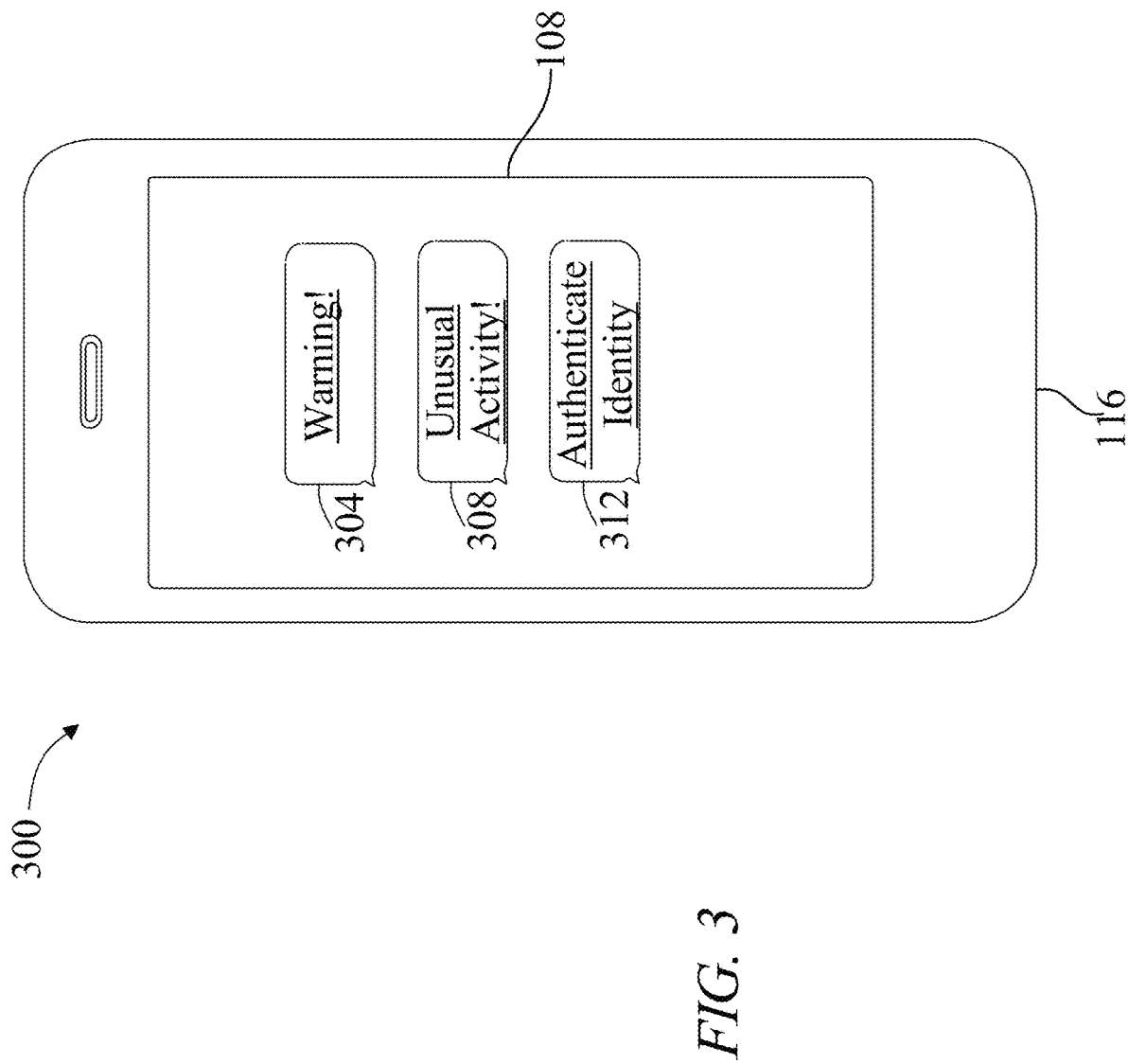
FIG. 3 is a diagrammatic representation of secure communication channel interface.

Referring now to FIG. 3, an exemplary embodiment 300 of secure communication channel interface 108 is illustrated. Secure communication channel interface 108 may be implemented as any structure as described above in more detail in reference to FIG. 1. In an embodiment, secure communication channel interface 108 may be displayed using display interface 112 on user client device. In an embodiment, communication channel interface 108 may display a warning message upon detecting a change in security. For example, secure communication channel interface 108 may display a first message 304 "Warning!" Communication channel interface 108 may display a second message 308 providing a rationale or reason for the first message 304, where the second message 308 may state "Unusual Activity!" Communication channel interface 108 may display a third message 312 prompting user client device 116 to "authenticate identity." User client device 116 may authenticate identify such as by being transmitted a new configuration packet to authenticate. In yet another non-limiting example, user client device 116 may authenticate identity of user client device 116 by establishing a new security baseline parameter 124, utilizing any of the methodologies as described above in more detail in reference to FIG. 1.

Figure 4:
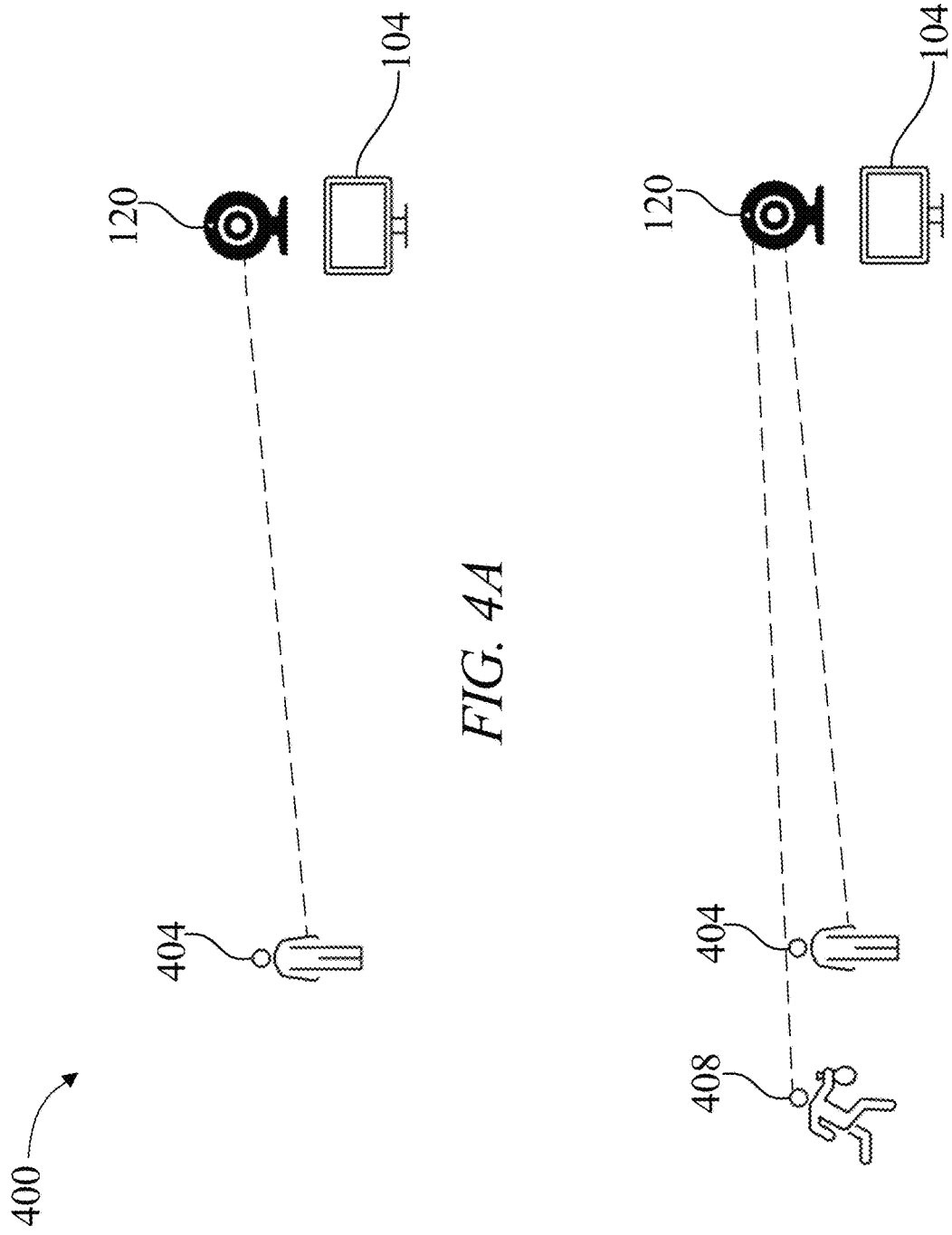
FIGS. 4A-4B are diagrammatic representations of detecting a change in security.

Referring now to FIGS. 4A-4B, an exemplary embodiment 400 of detecting a change in security is illustrated. Referring to FIG. 4A, audiovisual capture device 120, captures a baseline audiovisual measurement of a user 404. A baseline audiovisual measurement 124 may include detecting levels of motion and/or sound in a room where user 404 is located, while waiting for a videoconference appointment to begin, for example. A baseline audiovisual measurement 124 may include using audiovisual capture device 120 to capture one or more images of a user 404, such as by taking a picture or video of a user's entire body, face, and/or one or more distinguishing features. Information relating to a baseline audio visual measurement may be stored within security database 128 as described above in more detail in reference to FIGS. 1-3. Referring now to FIG. 4B, audiovisual capture device 120 detects a change in security, as a function of a security baseline parameter 124. For example, audiovisual capture device 120 and/or computing device 120 may detect a physical intrusion, such as when a bad actor 408 may unexpectedly enter a room where user 404 is located. In such an instance, computing device 104 executes a mitigation action 136 to prevent a security breach caused by bad actor 408. For example, a mitigation action 136 may include temporarily suspending secure communication channel interface 108 and asking user 404 to re-enter credentials before resuming secure communication channel interface 108. A mitigation action 136 may include any of the mitigation actions 136 as described above in more detail in reference to FIG. 1.

Figure 5:
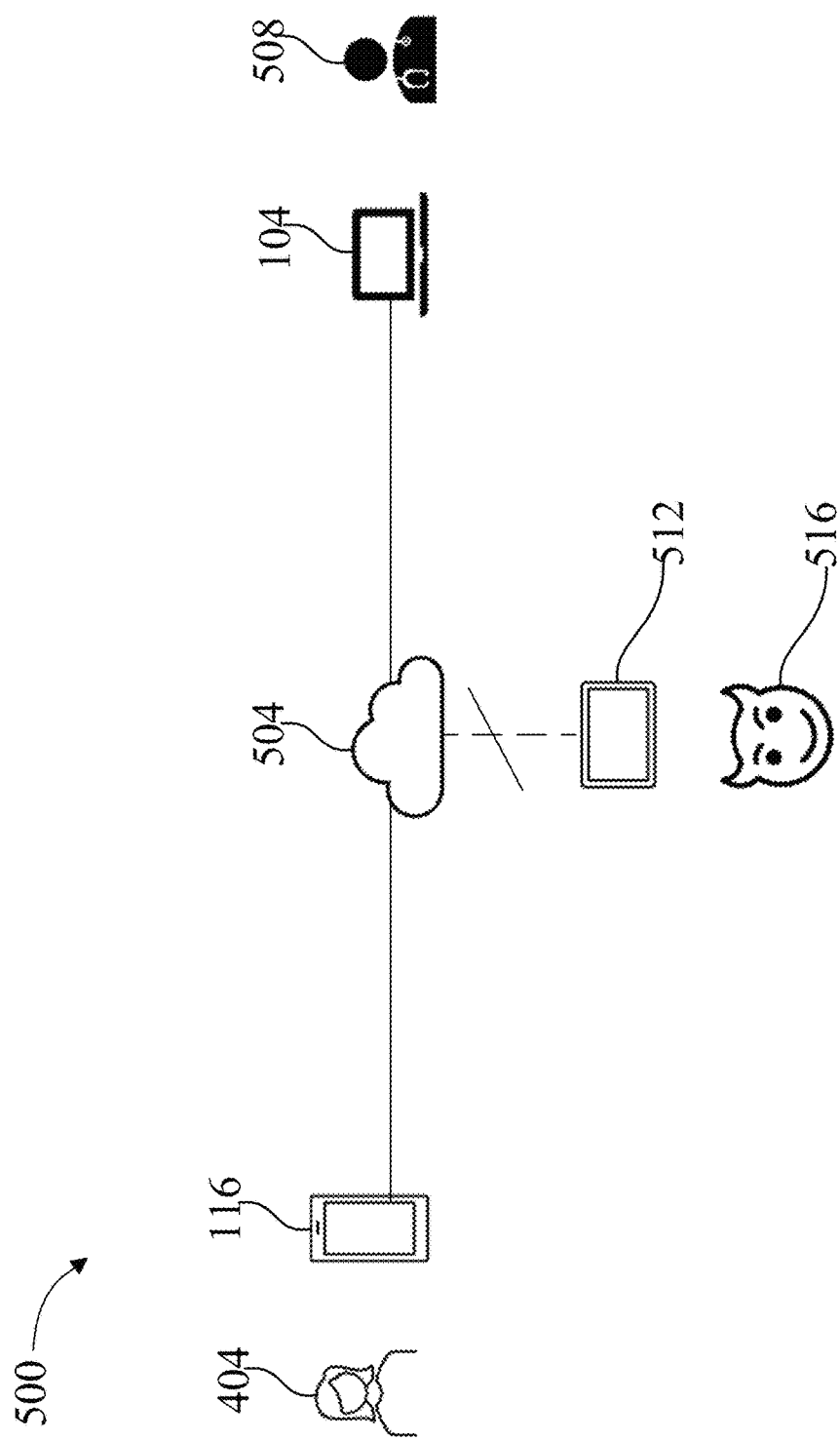
FIG. 5 is a diagrammatic representation of detecting a change in local network.

Referring now to FIG. 5, an exemplary embodiment 500 of detecting a change in local network traffic is illustrated. Computing device 104 establishes a security baseline parameter 124 such as by identifying a network parameter. A network parameter includes any of the network parameters ad described above in more detail in reference to FIG. 1. For example, a network parameter may include information relating to any computing devices that are in communication with user client device 116 and/or computing device 104. For instance and without limitation, a network parameter may measure traffic level on a network 504 such as by sniffing using a packet analyzer that intercepts and logs traffic that passes over a digital network 504 and/or part of a network 504, as described above in more detail in reference to FIG. 1. For example, a network parameter may indicate that user client device 116, operated by user 404 and computing device 104 operated by second user 508, such as a medical doctor, are both connected to network 504 and utilizing network 504 to initiate secure communication channel interface 108 to enable a telemedicine appointment. Computing device 104 utilizes network parameters, to detect any changes in local network traffic, such as when a third device 512 operated by a malicious user 516, attempts to joint network 504, and intercept information exchanged with secure communication channel interface 108. In such an instance, a change in local network traffic prompts computing device 104 to execute a mitigation action 136, such as by eliciting an early warning detection message, and displaying the message on display interface 112. In such an instance, computing device 104 may prompt user 404 to re-enter credentials, to resume a telemedicine appointment with second user 508.

Figure 6:
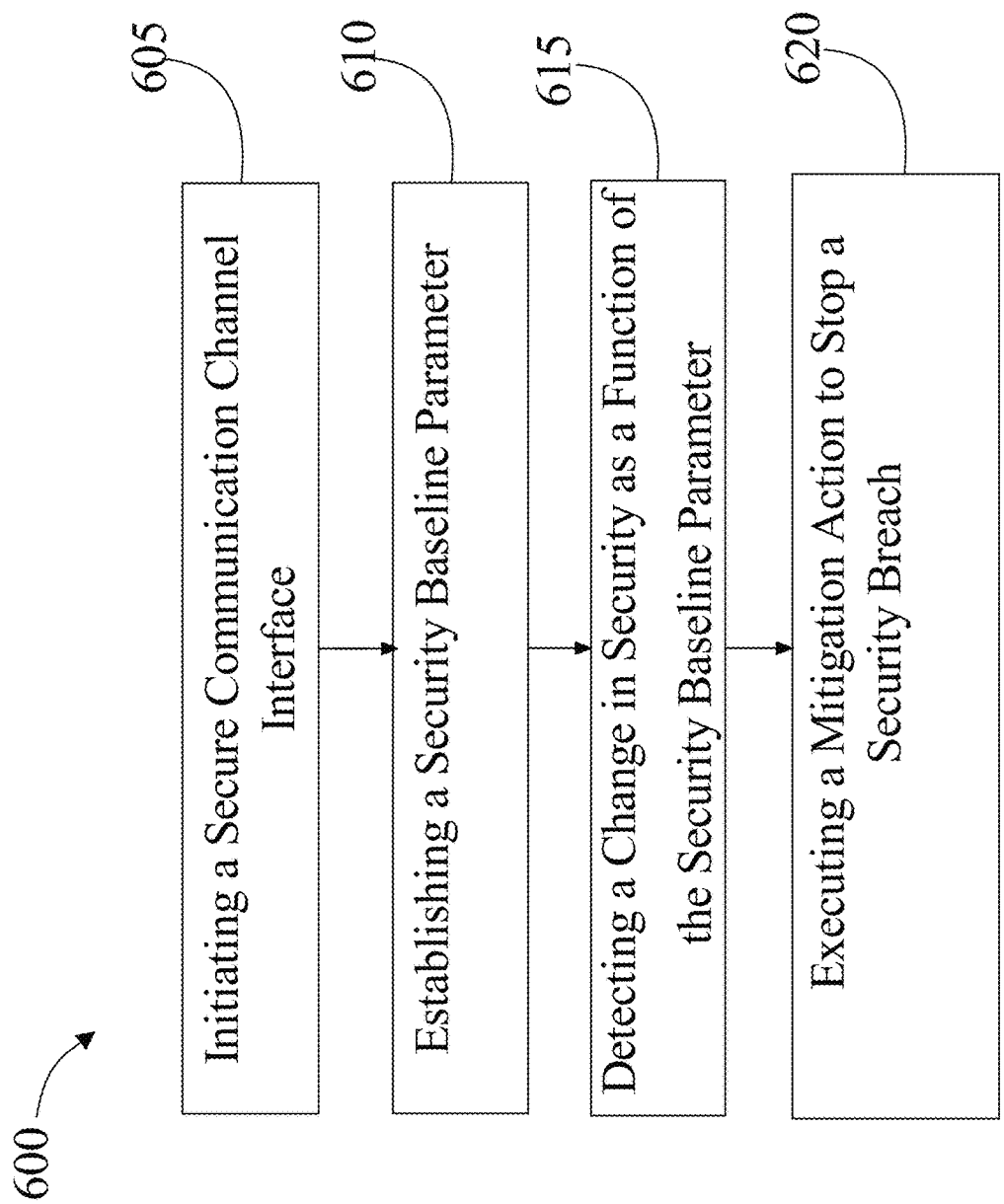
FIG. 6 is a process flow diagram illustrating an exemplary embodiment of a method of generating a secure communication channel interface.

Referring now to FIG. 6, an exemplary embodiment 600 of a method of generating a secure communication channel interface for video streaming of sensitive content is illustrated. At step 605, computing device 104 initiates a secure communication channel interface 108 between user client device 116 and computing device 104. Secure communication channel interface 108 includes any of the secure communication channel interfaces as described above in more detail in reference to FIG. 1. A secure communication channel interface 108 may include an application, script, and/or program capable of providing a means of communication between at least two parties, including any oral and/or written forms of communication. A secure communication channel interface 108 may be launched between a user client device 116 operated by a user, and computing device 104 which may be operated by a third party, such as a functional medicine doctor. A secure communication channel interface 108 may be used for example, to accommodate a telemedicine appointment, or to facilitate secure communications between members of a support group, such as users who have a gambling addition or users who are seeking to abstain from one or more addictive practices including but not limited to alcohol, drugs, sex, gambling, medications, shopping, video games, plastic surgery, eating disorders, risky behavior and the like. Secure communication channel interface 108 includes an audiovisual capture device 120, including any of the audiovisual capture devices 120 as described above in more detail in reference to FIG. 1. For instance and without limitation, an audiovisual capture device 120 may include a video camera, a camera, a sensor, a microphone, and the like.

With continued reference to FIG. 6, at step 610, computing device 104 establishes a security baseline parameter 124 within secure communication channel interface 108 wherein establishing the security baseline parameter 124 includes establishing using audiovisual capture device 120, a baseline user environment landmark. Security baseline parameter 124 includes any of the security baseline parameters 124 as described above in more detail in reference to FIG. 1. Establishing a security baseline parameter 124 may include capturing using audiovisual capture device 120, a baseline audiovisual measurement. A baseline audiovisual measurement may include using audiovisual capture device 120 to scan a room where a user may be located, including a room where a user is located using user client device 116 and including a room where an operator of computing device 104 may be located, such as a functional medicine doctor. For example, a baseline audio visual measurement may capture video footage of a user sitting in a bedroom in the user's house, and video footage of a nurse practitioner sitting in the nurse practitioner's office, so that the user and the nurse practitioner may engage in a secure communication exchange. Information pertaining to a security baseline parameter may be stored within security database 124, as described above in more detail in reference to FIG. 1.

With continued reference to FIG. 6, establishing a security baseline parameter 124 includes identifying a network parameter. A network parameter includes any of the network parameters as described above in more detail in reference to FIG. 1. A network parameter may include measuring traffic levels through a local network for a defined period of time, prior to allowing a connection to join the local network. A network parameter may be measured by sniffing using a packet analyzer, as described above in more detail in reference to FIG. 1. Establishing a security baseline parameter may include determining a geolocation of a user client device 116 as a function of a geolocation of computing device 104. A geolocation of user client device 116 and/or computing device 104 may be determined using any of the methodologies as described above in more detail in reference to FIG. 1. For instance and without limitation, computing device 104 may match a geolocation of user client device 116 to geolocation of computing device 104 operated by a physician located at a hospital three miles away.

With continued reference to FIG. 6, at step 615, computing device 104 detects a change in security as a function of a security baseline parameter 124 wherein detecting the change in security comprises detecting a change in relation to the baseline user environment landmark. Computing device 104 detects a change in security utilizing any of the methodologies as described above in more detail in reference to FIG. 1. Detecting a change in security includes detecting a physical intrusion using audiovisual capture device 120. For instance and without limitation, audiovisual capture device 120 may detect a physical intrusion such as a nurse who may enter a doctor's office while a doctor is communicating with a patient through secure communication channel interface 108. In yet another non-limiting example, audiovisual capture device 120 may detect a physical intrusion such as an object that may shift or move behind a user in a room. Detecting a change in security may include detecting a change in an optically detected motion level. A change in an optically detected motion level may be measured using DCT of a video feed as described above in more detail in reference to FIG. 1. Detecting a change in security may include detecting a change in local network traffic, including any traffic that is diverted to or from a network, detecting new devices that may attempt to join a network and the like. Detecting a change in security may include detecting any lighting aberrations, changes in geometries, or sharp differences in audio that would suggest a security breach during utilization of secure communication channel interface 108. Detecting a change in security may include detecting any attempts by secondary devices to communicated with user client device 116 and/or computing device 104, such as an unexpected Bluetooth pairing, hot spot linking, and the like.

With continued reference to FIG. 6, at step 620, computing device 104 executes a mitigation action 136 to prevent a security breach. A mitigation action 136 includes any of the mitigation actions as described above in more detail in reference to FIG. 1. A mitigation action may include displaying within secure communication channel interface 108 a warning message. A warning message includes any of the warning messages as described above in more detail in reference to FIG. 1. Computing device 104 may display a warning message on display interface 112. Computing device 104 transmits to user client device 116 a new configuration packet and authenticates the security of user client device as a function of the new configuration packet. This may be performed utilizing any of the methods as described above in more detail in reference to FIG. 1. Computing device 104 authenticates the security of user client device 116 as a function of the new configuration packet. A mitigation action includes pausing the initiation of secure communication channel 108 as a function of detecting a change in security. For example, a user may be discussing the user's alcohol additions with a friend using secure communication channel interface 108. In such an instance, computing device 104 may detect a change in security that identifies an attempt by a third party device to join communications with user and user's friend within secure communication channel interface 108. Computing device 104 pauses the initiation of secure communication channel interface 108 as a function of detecting a change in security and confirms the security of user client device 116 and computing device 104 before reinitiating secure communication channel interface 108. Computing device 104 executes a mitigation action 136 by detecting a new program session on user client device 116. A new program session includes any of the new program sessions as described above in more detail in reference to FIG. 1. For example, a new program session may include preventing more than one simultaneous session using secure communication channel interface 108 by user client device 116. Computing device 104 disables a new program session while secure communication channel interface 108 is in use. For example, computing device 104 may disable user client device 116 capabilities during use of secure communication channel interface 108, where applications such as screenshots, page printing, and screen sharing may be prohibited to protect a user's information from being stolen.

Figure 7:
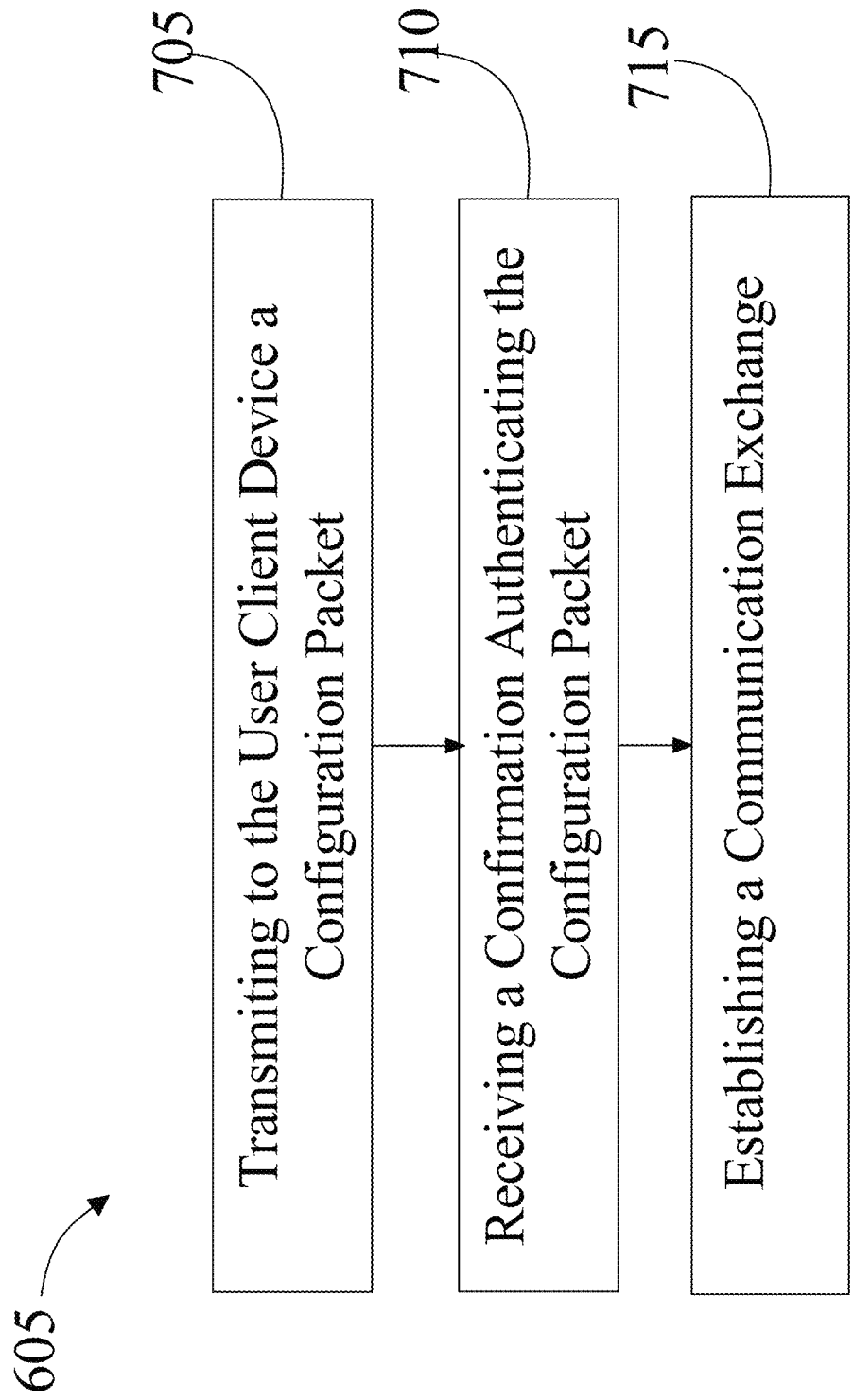
FIG. 7 is a process flow diagram illustrating an exemplary embodiment of a method of establishing a security baseline parameter.

Referring now to FIG. 7, an exemplary embodiment 605 of establishing by computing device 104 a security baseline parameter within secure communication channel interface is illustrated. At step 705, computing device 104 transmits to user client device 116 a configuration packet 132 uniquely identifying computing device 104. Configuration packet 132 includes any of the configuration packets 132 as described above in more detail in reference to FIG. 1. In an embodiment, configuration packet 132 may include an encrypted message, containing a non-public device identifier of computing device 104, such as a token and/or passcode. User client device 116 may transmit to computing device 104 a configuration packet 132 for computing device 104 to authenticate. In such an instance, computing device 104 and user client device 116 may each run a command within its own kernel space to decode each message, and then independently accept or deny a configuration packet 132, thereby forming a device handshake. Device handshake may be executed using any of the methodologies as described above in more detail in reference to FIG. 1. This may be performed to aid in preventing any transport layer ports used by secure communication channel interface 108 from being used by any other communication pathway. At step 710, computing device 104 receives from user client device 116 a confirmation authenticating configuration packet 132. At step 715, computing device 104 establishes a communication exchange as a function of authenticating configuration packet 132.

Figure 8:
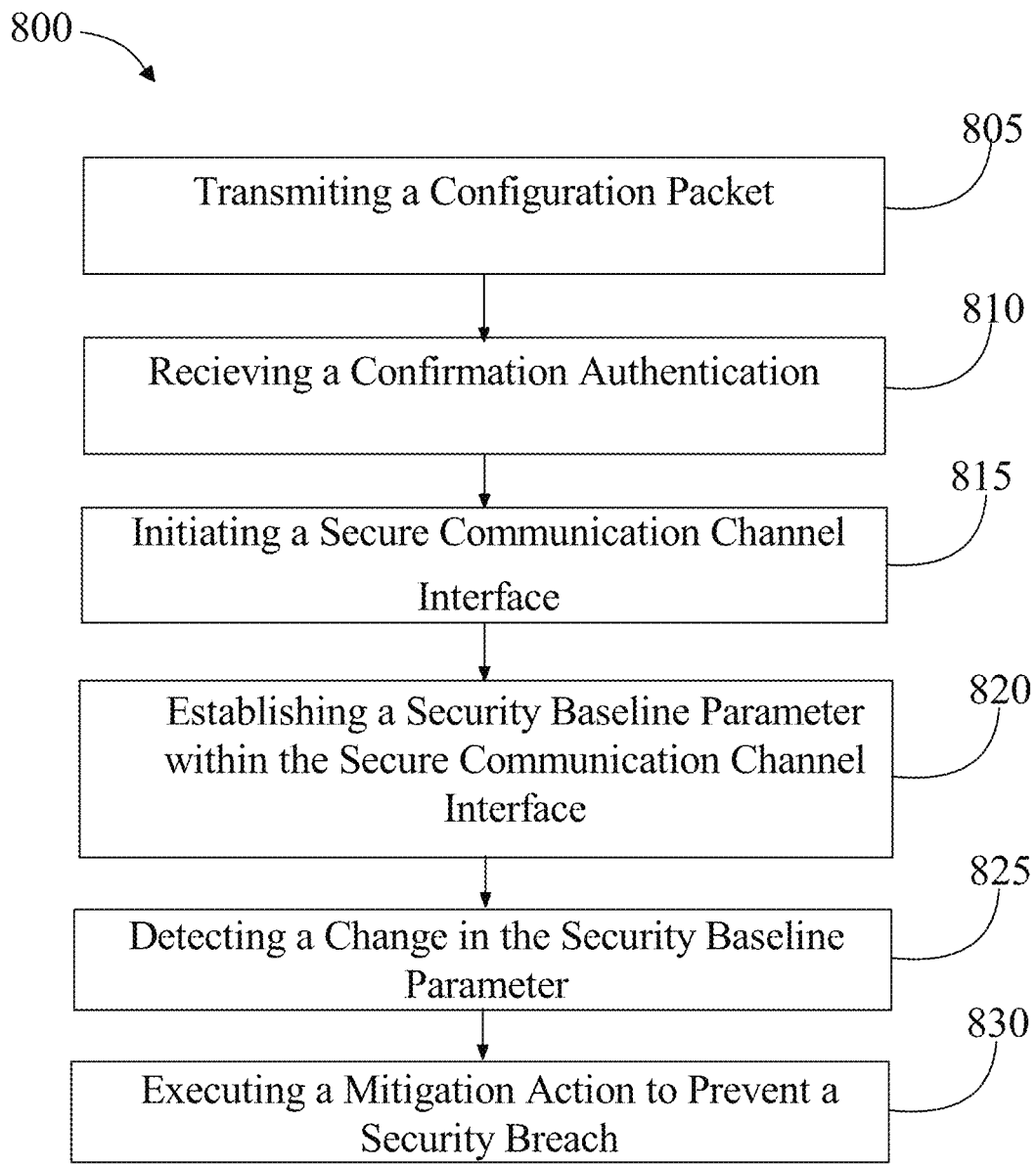
FIG. 8 is a flow diagram illustrating an exemplary embodiment of a method for generating a secure communication channel interface for video streaming of sensitive content.

Referring now to FIG. 8, a method 800 is shown. Method 800 may be implemented, without limitation, as disclosed with reference to FIGS. 1-7. Method 800 includes a step 805 of transmitting, at a computing device and to a user client device, a configuration packet uniquely identifying the computing device. This may be implemented, without limitation, as disclosed with reference to FIGS. 1-7. In some embodiments, the user client device may be operated by a user and the computing device may be operated by a medical professional. In some embodiments, the configuration packet may include a non-public device identifier of the computing device.

With continued reference to FIG. 8, method 800 includes a step 810 of receiving, at the computing device and from the user client device, a confirmation authentication for the configuration packet. This may be implemented, without limitation, as disclosed with reference to FIGS. 1-7.

With continued reference to FIG. 8, method 800 includes a step 815 of initiating, at the computing device, a secure communication channel interface with the user client device. This may be implemented, without limitation, as disclosed with reference to FIGS. 1-7. In some embodiments, the secure communication channel interface may include a display interface.

With continued reference to FIG. 8, method 800 includes a step 820 of establishing, at the computing device, a security baseline parameter within the secure communication channel interface, wherein establishing a security baseline parameter includes capturing a baseline audiovisual measurement using an audiovisual capture device. This may be implemented, without limitation, as disclosed with reference to FIGS. 1-7.

With continued reference to FIG. 8, method 800 includes a step 825 of detecting, at the computing device, a change in the security baseline parameter by detecting a change in relation to a baseline user environment landmark. This may be implemented, without limitation, as disclosed with reference to FIGS. 1-7. Step 825 includes pausing the initiation of the secure communication channel interface as a function detecting the change in security. This may be implemented, without limitation, as disclosed with reference to FIGS. 1-7. Step 825 includes confirming the security of the user client device and the computing device. This may be implemented, without limitation, as disclosed with reference to FIGS. 1-7. Step 825 includes reinitiating the secure communication channel. This may be implemented, without limitation, as disclosed with reference to FIGS. 1-7. In some embodiments, the baseline user environment landmark may include a baseline audiovisual measurement. In some embodiments, the baseline user environment landmark may include a network parameter. In some embodiments, the baseline user environment landmark may include a geolocation of the user client device as a function of a geolocation of the computing device.

With continued reference to FIG. 8, method 800 includes a step 830 of executing, at the computing device, a mitigation action to prevent a security breach. This may be implemented, without limitation, as disclosed with reference to FIGS. 1-7.

With continued reference to FIG. 8, method 800 may include a step of displaying, on the display interface, instructions to the user. This may be implemented, without limitation, as disclosed with reference to FIGS. 1-7. In some embodiments, method 800 may include a step of detecting a new program session on the user client device. This may be implemented, without limitation, as disclosed with reference to FIGS. 1-7. In some embodiments, method 800 may include disabling the new program session. This may be implemented, without limitation, as disclosed with reference to FIGS. 1-7. In some embodiments, method 800 may include a step of establishing a communication exchange as a function of receiving the confirmation identification of configuration packet from the user client device. This may be implemented, without limitation, as disclosed with reference to FIGS. 1-7.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 9:
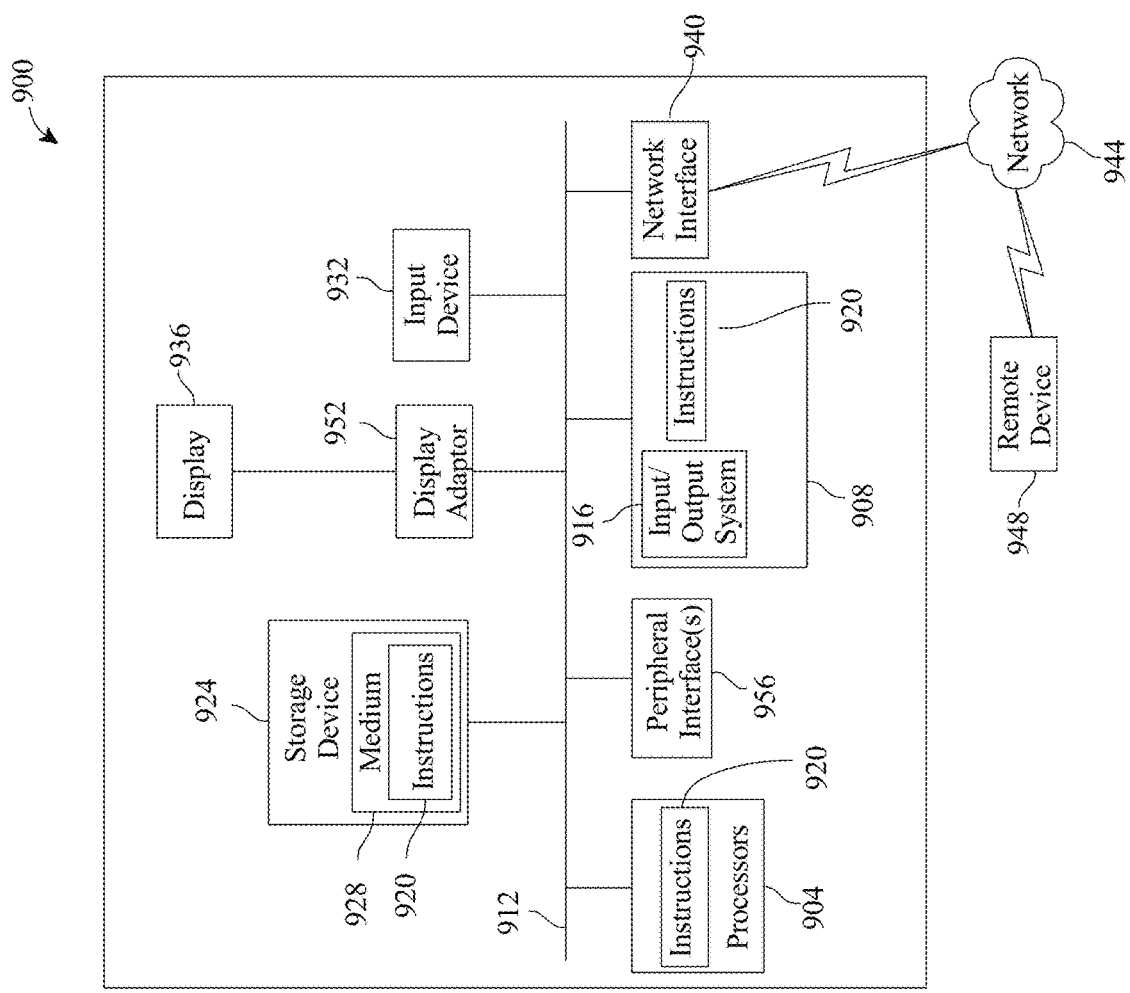
FIG. 9 is a block diagram of a computing system that can be used to implement any one or more of the methodologies disclosed herein and any one or more portions thereof.

FIG. 9 shows a diagrammatic representation of one embodiment of a computing device in the exemplary form of a computer system 900 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 900 includes a processor 904 and a memory 908 that communicate with each other, and with other components, via a bus 912. Bus 912 may include any of several types of bus structures including, but not limited to, a memory bus, a memory controller, a peripheral bus, a local bus, and any combinations thereof, using any of a variety of bus architectures.

Processor 904 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 904 may be organized according to Von Neumann and/or Harvard architecture as a non-limiting example. Processor 904 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 908 may include various components (e.g., machine-readable media) including, but not limited to, a random-access memory component, a read only component, and any combinations thereof. In one example, a basic input/output system 916 (BIOS), including basic routines that help to transfer information between elements within computer system 900, such as during start-up, may be stored in memory 908. Memory 908 may also include (e.g., stored on one or more machine-readable media) instructions (e.g., software) 920 embodying any one or more of the aspects and/or methodologies of the present disclosure. In another example, memory 908 may further include any number of program modules including, but not limited to, an operating system, one or more application programs, other program modules, program data, and any combinations thereof.

Computer system 900 may also include a storage device 924. Examples of a storage device (e.g., storage device 924) include, but are not limited to, a hard disk drive, a magnetic disk drive, an optical disc drive in combination with an optical medium, a solid-state memory device, and any combinations thereof. Storage device 924 may be connected to bus 912 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 924 (or one or more components thereof) may be removably interfaced with computer system 900 (e.g., via an external port connector (not shown)). Particularly, storage device 924 and an associated machine-readable medium 928 may provide nonvolatile and/or volatile storage of machine-readable instructions, data structures, program modules, and/or other data for computer system 900. In one example, software 920 may reside, completely or partially, within machine-readable medium 928. In another example, software 920 may reside, completely or partially, within processor 904.

Computer system 900 may also include an input device 932. In one example, a user of computer system 900 may enter commands and/or other information into computer system 900 via input device 932. Examples of an input device 932 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 932 may be interfaced to bus 912 via any of a variety of interfaces (not shown) including, but not limited to, a serial interface, a parallel interface, a game port, a USB interface, a FIREWIRE interface, a direct interface to bus 912, and any combinations thereof. Input device 932 may include a touch screen interface that may be a part of or separate from display 936, discussed further below. Input device 932 may be utilized as a user selection device for selecting one or more graphical representations in a graphical interface as described above.

A user may also input commands and/or other information to computer system 900 via storage device 924 (e.g., a removable disk drive, a flash drive, etc.) and/or network interface device 940. A network interface device, such as network interface device 940, may be utilized for connecting computer system 900 to one or more of a variety of networks, such as network 944, and one or more remote devices 948 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 944, may employ a wired and/or wireless mode of communication. In general, any network topology may be used. Information (e.g., data, software 920, etc.) may be communicated to and/or from computer system 900 via network interface device 940.

Computer system 900 may further include a video display adapter 952 for communicating a displayable image to a display device, such as display device 936. Examples of a display device include, but are not limited to, a liquid crystal display (LCD), a cathode ray tube (CRT), a plasma display, a light emitting diode (LED) display, and any combinations thereof. Display adapter 952 and display device 936 may be utilized in combination with processor 904 to provide graphical representations of aspects of the present disclosure. In addition to a display device, computer system 900 may include one or more other peripheral output devices including, but not limited to, an audio speaker, a printer, and any combinations thereof. Such peripheral output devices may be connected to bus 912 via a peripheral interface 956. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for generating a secure communication channel interface for video streaming of sensitive content, the system comprising a computing device designed and configured to:
   transmit, to a user client device operated by a user, a configuration packet uniquely identifying the computing device operated by a medical professional;
   receive, from the user client device, a confirmation authentication for the configuration packet;
   initiate a secure communication channel interface with the user client device;
   establish a security baseline parameter within the secure communication channel interface, wherein establishing the security baseline parameter comprises identifying a network parameter, wherein establishing the security baseline parameter includes identifying using an audiovisual measurement device:
      a baseline audiovisual measurement
      one or more user-biometric identifiers; and
      a user environment landmark comprising a physical object; and
   detect a change in the security baseline parameter by detecting changes in relation to the baseline audiovisual measurement and the one or more user-biometric identifiers, wherein detecting the change in the security baseline parameter includes:
      pausing the initiation of the secure communication channel interface as a function of detecting the change in the security baseline parameter;
   execute a mitigation action to prevent a security breach, wherein executing the mitigation action comprises:
      transmitting, to the user client device, a new configuration packet; and
      authenticating the user client device; and
   confirm the security of the user client device and the computing device, wherein confirming the security of the user client device comprises establishing a second security parameter, wherein establishing the second security parameter comprises establishing secure login credentials as a function of an inherent factor; and
   reinitiate the secure communication channel interface.

2. The system of claim 1, wherein the secure communication channel interface includes a display interface.

3. The system of claim 2, wherein the computing device is configured to display, on the display interface, instructions to a user.

4. The system of claim 1, wherein the user client device is operated by a user and the computing device is operated by a medical professional.

5. The system of claim 1, wherein the computing device is further configured to:
   detect a new program session on the user client device; and
   disable the new program session.

6. The system of claim 1, wherein the configuration packet includes a non-public device identifier of the computing device.

7. The system of claim 1, wherein the computing device is configured to establish a communication exchange as a function of receiving the confirmation identification of the configuration packet from the user client device.

8. A method for generating a secure communication channel interface for video streaming of sensitive content, the method comprises:
   transmitting, at a computing device operated by a medical professional and to a user client device operated by a user, a configuration packet uniquely identifying the computing device;
   receiving, at the computing device and from the user client device, a confirmation authentication for the configuration packet;
   initiating, at the computing device, a secure communication channel interface with the user client device;
   establishing, at the computing device, a security baseline parameter within the secure communication channel interface, wherein establishing the security baseline parameter comprises identifying a network parameter, wherein establishing the security baseline parameter includes identifying using an audiovisual measurement device:

a baseline audiovisual
one or more user-biometric identifiers; and
a user environment landmark comprising a physical object; and
detecting, at the computing device, a change in the security baseline parameter by detecting changes in relation to the baseline audiovisual measurement and the one or more user-biometric identifiers, wherein detecting the change in the security baseline parameter includes:
pausing the initiation of the secure communication channel interface as a function of detecting the change in the security baseline parameter;
executing, at the computing device, a mitigation action to prevent a security breach, wherein executing the mitigation action comprises:
transmitting, to the user client device, a new configuration packet; and
authenticating a security of the user client device; and
confirming, at the computing device, the security of the user client device and the computing device, wherein confirming the security of the user client device comprises establishing a second security parameter, wherein establishing the second security parameter comprises establishing secure login credentials as a function of an inherent factor; and
reinitiating the secure communication channel interface.

9. The method of claim 8, wherein the secure communication channel interface includes a display interface.

10. The method of claim 9, further comprising displaying, on the display interface, instructions to a user.

11. The method of claim 8, wherein the user client device is operated by a user and the computing device is operated by a medical professional.

12. The method of claim 8, further comprising:
detecting a new program session on the user client device; and
disabling the new program session.

13. The method of claim 8, wherein the configuration packet includes a non-public device identifier of the computing device.

14. The method of claim 8, further comprising establishing a communication exchange as a function of receiving the confirmation identification of the configuration packet from the user client device.

\* \* \* \* \*